United States Patent [19]

Champion et al.

[11] Patent Number: 5,441,423
[45] Date of Patent: Aug. 15, 1995

[54] REMOVABLE ATTACHMENT TO INTEGRALLY JOIN A FLAT SUPPORT TO AN ELEMENT

[75] Inventors: Patrick Champion; Jacky Thenaisie, both of Le Mans, France

[73] Assignee: Framatome Connectors France, Versailles, France

[21] Appl. No.: 134,963

[22] Filed: Oct. 12, 1993

[30] Foreign Application Priority Data

Oct. 13, 1992 [FR] France ................ 92 12208

[51] Int. Cl.6 ............................................. H01R 13/73
[52] U.S. Cl. ................................................. 439/567
[58] Field of Search ............ 439/567, 571, 572, 557, 439/554, 607; 248/224.3

[56] References Cited

U.S. PATENT DOCUMENTS

| | | | |
|---|---|---|---|
| 3,774,142 | 11/1973 | Siegler | 439/109 |
| 4,765,036 | 8/1988 | Iguchi et al. | 24/289 |
| 4,889,502 | 12/1989 | Althouse et al. | 439/607 |
| 5,108,308 | 4/1992 | Northcraft et al. | 439/571 |
| 5,108,312 | 4/1992 | Sampson | 439/607 |

FOREIGN PATENT DOCUMENTS

| | | |
|---|---|---|
| 2668214 | 4/1992 | France . |
| 4016890A1 | 11/1991 | Germany . |
| 4032565A1 | 4/1992 | Germany . |
| 1017929 | 1/1966 | United Kingdom . |
| 2239135A | 6/1991 | United Kingdom . |

*Primary Examiner*—Gary F. Paumen
*Attorney, Agent, or Firm*—Perman & Green

[57] ABSTRACT

The invention concerns a removable attachment in order to integrally join at least one flat support, such as a circuit support, to an element, characterized by the fact that it comprises an axial retention device (20,60) having a first retention means (22,63), assuring its retention on a first piece (32,81) borne by said element (1,31) and at least one second retention means (23,86) assuring the retention of the flat support (9,70).

7 Claims, 2 Drawing Sheets

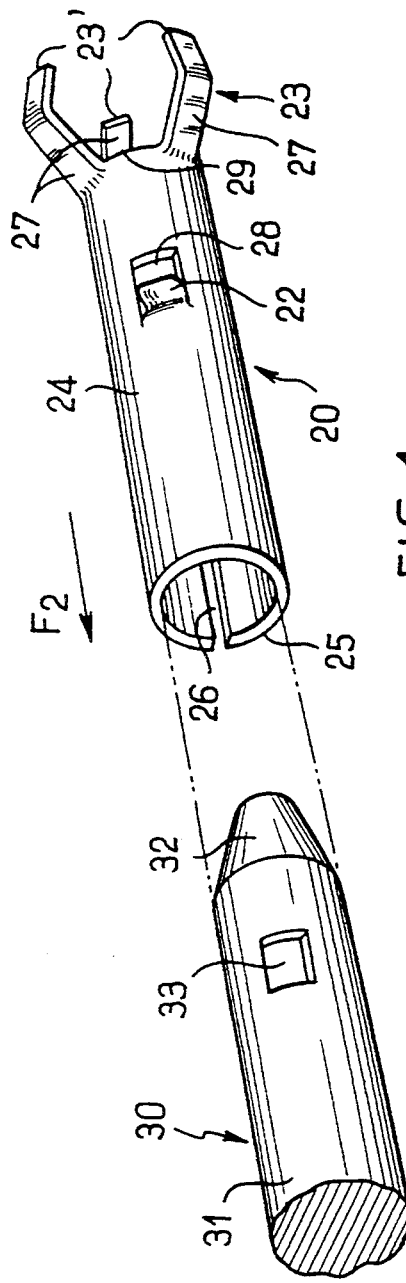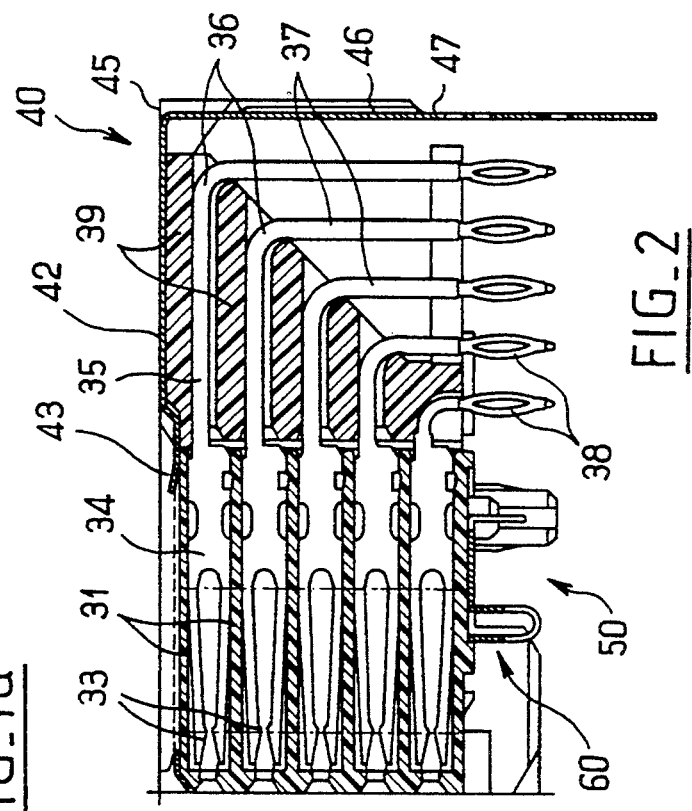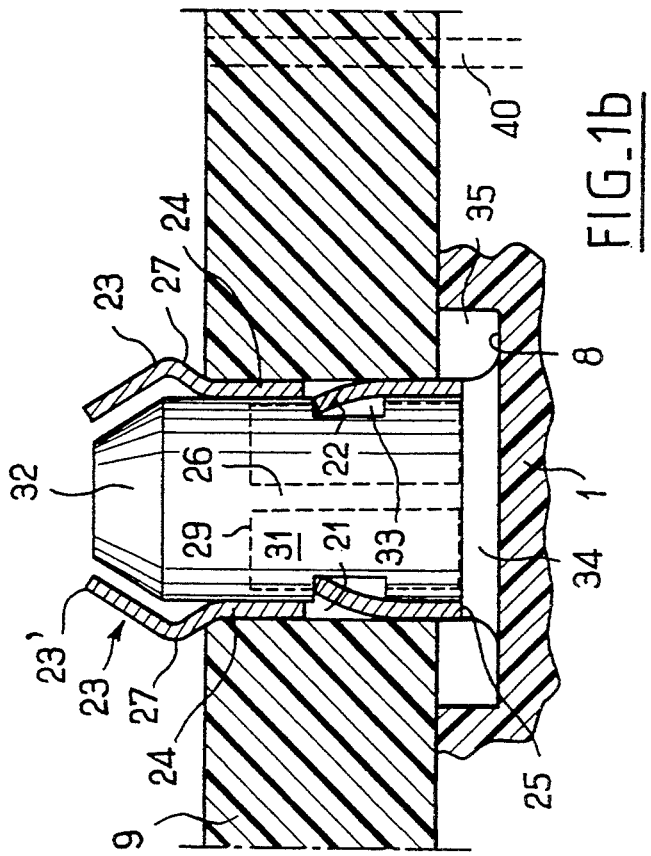

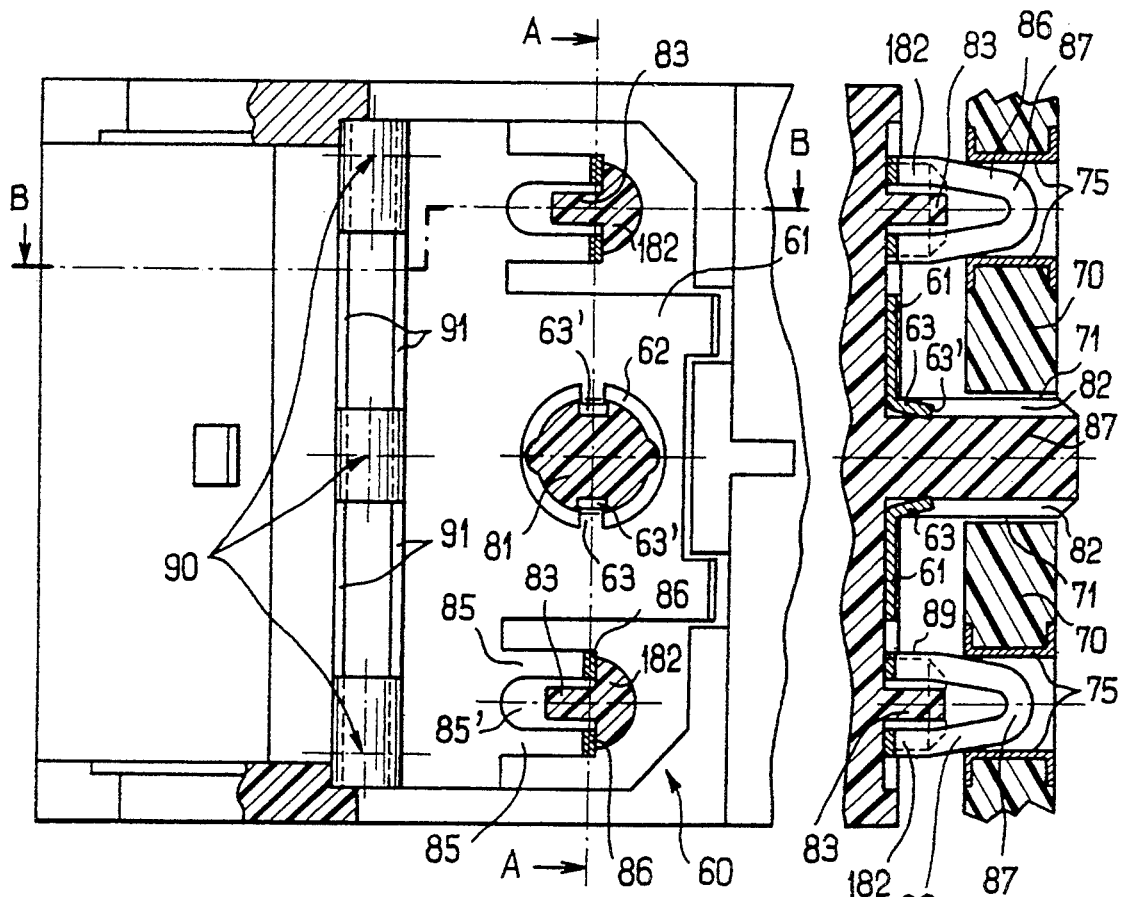
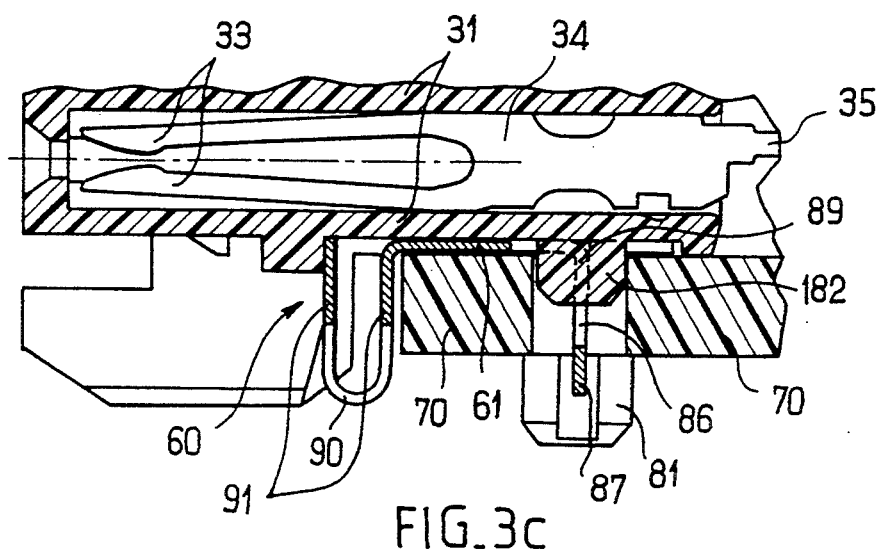
FIG. 3a
FIG. 3b
FIG. 3c

REMOVABLE ATTACHMENT TO INTEGRALLY JOIN A FLAT SUPPORT TO AN ELEMENT

BACKGROUND OF THE INVENTION

The subject of the present invention is a removable attachment for integrally joining at least one flat support to an element.

In particular, a technique is known in the field of connections for integrally joining a flat support, such as a printed circuit to an element such as an insulating body, by employing an integral heat-deformable piece of the insulating body. By deformation of the piece with a metal stamp brought to elevated temperature, a rivet is obtained which solidly joins the flat support and the element, but in a non-detachable manner.

The present invention aims at eliminating the above given disadvantage.

SUMMARY OF THE INVENTION

The invention relates to a removable attachment for integrally joining at least one flat support, such as a circuit support, to an element, characterized by the fact that it comprises an axial retention device having a first means of retention assuring its retention on a first piece borne by said element and at least a second retention means assuring the retention of the flat support.

According to a first variant, the first and second retention means are coaxial.

According to a second variant, the first and second retention means are displaced laterally with respect to one another, and preferably (displaced) over at least a portion of the periphery of at least one second piece (borne) by said element.

The axial retention device is advantageously electrically conductive and the flat support can then contain at least one metallized hole permitting the assurance of electrical continuity between the removable attachment and the flat support.

The second retention means may advantageously have at least one elastic element placed in such a way that when it is introduced into the flat support, it is deformed so as to produce a forced locking, notably by coming to rest against the second piece.

According to a preferred mode of embodiment, the elastic element is a V-shaped arch whose proximal branch ends are made up in one piece with the attachment.

The attachment may constitute a shielding plate.

The first retention element may be force locked on the first piece.

DESCRIPTION OF THE DRAWINGS

Other characteristics and advantages of the invention will be more apparent upon reading the following description, given by way of nonlimiting example, in combination with the drawings in which:

FIGS. 1a and 1b show, respectively, in perspective and partial section, a first mode of embodiment of the invention.

FIG. 2 shows a connector according to a preferred mode of embodiment of the invention.

FIG. 3a is a detail viewed from the bottom of FIG. 2, and

FIGS. 3b and 3c are sections, respectively, according to A and according to B of FIG. 3a.

DETAILED DESCRIPTION OF THE INVENTION

In FIGS. 1a and 1b, a central unit 1 has a cylindrical piece designated by the general reference 30 and presenting a cylindrical region 31, at least one lodging or aperture 33 and an end 32 of truncated-cone shape. Contact elements 40 are lodged (for example by setting) in insulating unit 1, and cross a printed circuit 9. Cylindrical piece 30 is made up in one piece with central unit 1 and is manufactured in a way analogous to a heat-deformable piece of the prior art. A metal piece 20 has hollow cylindrical body 24 with a hollow slot 26 and at least one elastic arm 22 designed to catch in lodging 33. Piece 20 has a lower base end 25 coming to rest at the base of piece 30, and an upper end 29 which is extended by elastic arms 23, here numbered three and spread at (an angular distance of) 120°, but they could also be numbered four and spread at 90°. Elastic arm 23 has a proximal region 27 extending toward the outside and a distal region 23' forming an elbow with region 27, distal region 23' being directed toward the inside. Proximal region 27 serves as the catching rest in order to hold in place printed circuit 9 resting against an upper face 41 of central insulating unit 1.

In order to integrally join a printed circuit 9 to an insulating unit 1 having one or several cylindrical pieces 30, first cylindrical body 20 is introduced in the direction of arrow F2 until tongues 22 catch in lodgings 33. Then, the opening (or openings 21 of printed circuit 9 is (are) presented with distal end 23' of elastic arm 23. The format distal ends 23' permits a braking effect during introduction of opening 21. Elastic arms 23 are pushed toward the inside, which permits the introduction of printed circuit 9 until it comes to rest against face 41 of central unit 1 in a position in which a catching phenomenon is produced, on the printed circuit 9, of proximal end 27 by elastic deployment (spreading) of arms 23 toward the outside. The presence of a truncated-cone portion 32 at the end of cylindrical piece 30 permits defining a resting place for the folded back distal ends 23' of elastic arms 23 so as to avoid accidental deterioration of the latter during introduction of printed circuit 9. It is suitable to recall in fact that these parts may be of very small dimensions. In particular, the diameter of piece 30 is of the order of approximately 1 mm.

Piece 20 may be demounted by pivoting it around the axis of hollow cylinder 24 so as to disengage the elastic arm(s) 22 or lodging(s) (33).

It is also suitable to note that the presence of slot 26 permits facilitating the introduction of hollow cylindrical body 24 of piece 20 into cylindrical piece 30 by spreading the edges of slot 26 so as to avoid troublesome mechanical constraints on cylindrical piece 30. The presence of slot 26 also permits more easily demounting hollow cylindrical body 24 of cylindrical piece 30. It will be noted that in the case when it is not judged necessary to protect the end of elastic arms 23, unit 31 no longer needs to exceed printed circuit 9.

The device, in addition to the demountability of printed circuit 9 which is found in the preceding modes of embodiment, also presents the advantage of authorizing either a removable attachment with a hollow cylindrical body 24, or using cylindrical piece 30 as a heat-deformable piece. It is sufficient for this purpose to provide it with a suitable profile.

The connector according to the invention can also permit integrally joining to a central unit, in addition to a printed circuit, at least one other support, for example, a shielding plate.

FIG. 2 represents a connector 40 for joining a male connector and a female card.

It comprises a front insulating unit 31 having openings in which female contacts 33 are placed and extended toward the back via cylindrical conductors 35 forming a 90° elbow at 36 and having a back part 37 extended by male contacts 38 with press fit. Cylindrical contacts 35,36,37 are sunk in a back insulating block designated by the general reference 39. A shielding element comprises a back region 46 terminating by press fit contacts 47 and a front region 42 making a 90° angle (at 45) with back region 46. Front region 42 is terminated by a contact region 43.

In the neighborhood of male contacts 38 and in the front direction of connector 40 a fixation device is placed and designated by general reference 50, permitting the integral joining of a flat support, such as a printed circuit (female card 70) to connector 40. This fixation device comprises a removable attachment designated by general reference 60.

As FIGS. 3a to 3c show more particularly, removable attachment 60 is comprised of a metal plate 61 having in a median region an opening 62 from which two curved arms or digits 63 are directed toward the outside. During the mounting of attachment 60, plate 61 is in parallel manner translated at the axis of a piece 81 made up in one piece with insulating unit 31, digits 63 being lodged in grooves 82 of piece 81 placed at (angular distance) 180°. Digits 63 assure a press locking of the plate, given that their end 63' exercises a certain pressure on the bottom of respective grooves 82. An extraction force applied to plate 61 forces digits 63 to arc-butt at the bottom of grooves 82 in order to oppose an extraction. This extraction remains possible, however, without adversely affecting the parts, but it is to be understood that this device is not provided for numerous demountings.

Metal plate 61 (here functioning as a shielding plate) also has two elastic devices having two arms 85 extending in the plane of plate 61 and separated by a space 85', and being extended by an arch 86 bent at 90° toward the outside, this arch 86 being progressively narrowed up to its rounded top 87, which confers on it a general V shape.

Space 85' between arms 85 is partially occupied by an extension 83 of a piece 182 of semicircular section. After plate 61 is placed as indicated above, female card 70 is presented and positioned in such a way that piece 81 passes into its opening 71 and so that pieces (182,83) and arch 86 pass through its metallized holes 75. As FIG. 3b shows, the width of arch 86 at its origin (rectilinear portion 89) is appreciably greater than the diameter of metallized holes 75, which permits a press locking function by elastic bending of arch 86 in the direction of extension 83 until it possibly comes to rest against the latter. Here, a locking has also been produced, authorizing one or more demountings. The demounting force may be selected in such a way that female card 30 may be disassembled with a given force, so that attachment 60 can be then demounted with a force greater than said given force.

It will be noted that if electrical contact is not desired, holes 75 need not be metallized. Plate 61 may be of a nonconducting material.

By way of variant, arch 86 can be replaced by two rectilinear or inwardly curved arms separated from one another (i.e., without top 87).

It will also be noted that elastic arms 22 (FIGS. 1a, 1b) may be produced as digits 63 in order to obtain a press locking rather than a positive locking.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. Removable attachment to integrally join at least one flat support, such as a circuit support, to an element, characterized in that the attachment comprises an axial retention device (60) having a first retention means (63) assuring the attachment's retention on a first piece (81) borne by said element (31) and at least one second retention means (86) assuring the retention of the flat support (70), wherein the first (63) and second (86) retention means are laterally shifted with respect to one another, are adapted to function independently of one another, and the second retention means (86) is displaced on at least one part of the periphery of at least one second piece (182, 83) borne by said element.

2. Removable attachment according to claim 1, further characterized in that the axial retention device (60) is electrically conductive and, in that the flat support (70) comprises at least one metallized hole (76) permitting the assurance of electrical continuity between the axial retention device (60) and the flat support (70).

3. Removable attachment according to claim 1, further characterized in that the second retention means has at least one elastic element (86, 87) placed in such a way that when the elastic element is introduced into flat support (70) it is deformed in such a way as to produce a press-fit connection.

4. Removable attachment according to claim 3, further characterized in that the elastic element is a V-shaped arch (86, 87) with branches (89) which are integral with the attachment.

5. Removable attachment according to claim 1, further characterized in that the attachment constitutes a shielding plate.

6. Removable attachment according to claim 1, further characterized in that the first retention element (22,63) is press fit on the first piece.

7. Connector characterized in that the connector comprises a removable attachment according to claim 1.

* * * * *